United States Patent
Johnson

(10) Patent No.: US 7,064,303 B2
(45) Date of Patent: Jun. 20, 2006

(54) TUBULAR HEATER AND METHOD OF MANUFACTURE

(75) Inventor: Evan J. Johnson, Eden Prairie, MN (US)

(73) Assignee: Thermetic Products, Inc., Minneapolis, MN (US)

( * ) Notice: Subject to any disclaimer, the term of this patent is extended or adjusted under 35 U.S.C. 154(b) by 0 days.

(21) Appl. No.: 11/022,555

(22) Filed: Dec. 23, 2004

(65) Prior Publication Data

US 2005/0184056 A1 Aug. 25, 2005

Related U.S. Application Data

(60) Provisional application No. 60/532,152, filed on Dec. 23, 2003.

(51) Int. Cl.
*H05B 3/44* (2006.01)

(52) U.S. Cl. .................. 219/544; 219/549; 219/523; 219/541; 219/542; 219/535; 219/548; 219/424

(58) Field of Classification Search ................ 219/544, 219/549, 541, 542, 523, 535, 424, 548
See application file for complete search history.

(56) References Cited

U.S. PATENT DOCUMENTS

| | | | |
|---|---|---|---|
| 2,375,058 A | 5/1945 | Wiegland | |
| 3,068,563 A | 12/1962 | Reverman | |
| 3,311,969 A | 4/1967 | Dillon | |
| 3,330,034 A | 7/1967 | Price | |
| 3,678,249 A | 7/1972 | Lennox | |
| 3,920,963 A | 11/1975 | Beasley et al. | |
| 3,927,301 A | 12/1975 | Heuel et al. | |
| 3,982,099 A | 9/1976 | Churchill | |
| 4,125,761 A | 11/1978 | Churchill | |
| 4,263,577 A | 4/1981 | Bauchert et al. | |
| 4,547,658 A * | 10/1985 | Crowley | 219/539 |
| 5,066,852 A | 11/1991 | Willbanks | |
| 5,225,662 A | 7/1993 | Schmidt | |
| 5,247,158 A | 9/1993 | Steinhauser et al. | |
| 5,575,941 A | 11/1996 | Johnson | |
| 5,798,504 A | 8/1998 | Schwarzkopf | |

(Continued)

FOREIGN PATENT DOCUMENTS

DE 9217183.4 4/1993

(Continued)

OTHER PUBLICATIONS

HOTSET, The Hotflex Heater, www.hotset.com/tubular, 2 pages.

(Continued)

*Primary Examiner*—Shawntina Fuqua
(74) *Attorney, Agent, or Firm*—Patterson, Thuente, Skaar & Christensen, P.A.

(57) ABSTRACT

A tubular heater that is manually bendable to fit into a channel comprises a heating element positioned in an insulative material such as magnesium oxide and encased in a continuous inner nickel tubular sheathing. An outer sheathing, in a preferred embodiment, comprises a coil of copper with a nickel coating swaged such that the cross-section of a strand of the coil is generally rectangular. The invention also includes the method of manufacturing and method of use of the tubular heater. Alternate embodiments include an outer tubular sheath that has a multiplicity of slits extending in a circumferential direction through the outer sheathing and the outer sheathing swaged directly on the inner sheathing. A further embodiment includes the outer tubular sheathing formed from a multiplicity of individual rings, the outer sheath could be swaged directly on the inner sheath.

17 Claims, 3 Drawing Sheets

U.S. PATENT DOCUMENTS

| | | | |
|---|---|---|---|
| 6,025,577 | A | 2/2000 | Schwarzkopf |
| 6,222,165 | B1 | 4/2001 | Schwarzkopf |
| 6,250,911 | B1 | 6/2001 | Schwarzkopf |
| 6,252,210 | B1 | 6/2001 | Schwarzkopf |
| 6,408,503 | B1 * | 6/2002 | Schwarzkopf ............... 29/611 |
| 6,414,281 | B1 * | 7/2002 | Long et al. ................. 219/478 |

FOREIGN PATENT DOCUMENTS

| | | |
|---|---|---|
| DE | 4418828 | 12/1995 |
| DE | 4447572 | 7/1996 |
| DE | 19541504 | 5/1997 |
| EP | 0742091 | 11/1996 |
| EP | 0688654 | 10/1999 |
| EP | 1117274 | 11/2000 |
| EP | 1083771 | 3/2001 |
| JP | 50047416 | 10/1976 |
| JP | 57223346 | 6/1984 |
| JP | 59114027 | 6/1984 |
| JP | 07114984 | 5/1995 |
| JP | 10199414 | 6/1999 |
| JP | 11340877 | 1/2001 |
| JP | 2001088144 | 4/2001 |

OTHER PUBLICATIONS

Swaging, How Swaging Works, 2 pages.

INCOE Corporation, Interchangeable tips give the XRCII™ Bushing extra flexibility, 1992, 1 page.

Watlow, Watrod Tubular Heaters, 2001, 2 pages.

HOTSET, Your Partner for Industrial Heating, Brochure, 1991, 11 pages.

TEMPCO, Tempco Electric Heater Corporation, Brochure, 25 pages.

Watlow, Everything you ever wanted to know about electric heaters and control systems, Catalog, 28 pages.

* cited by examiner

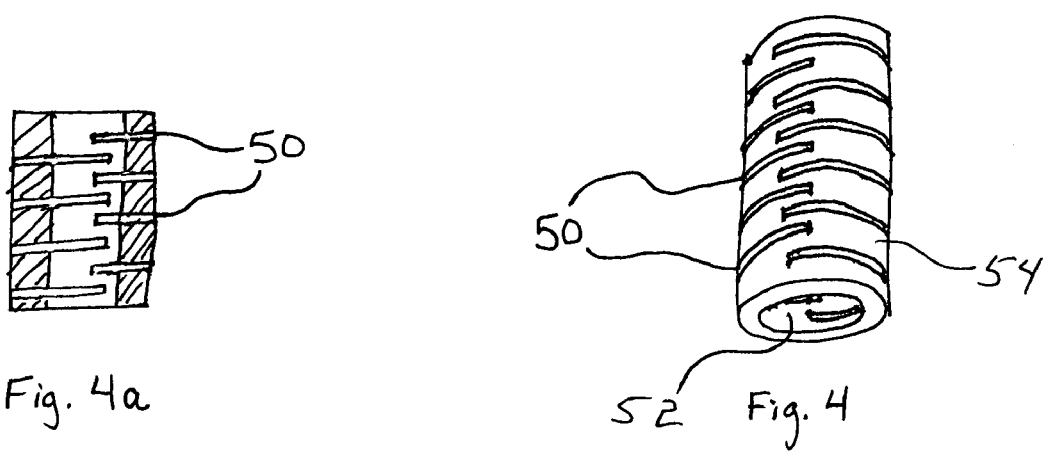
Fig. 4a
Fig. 4
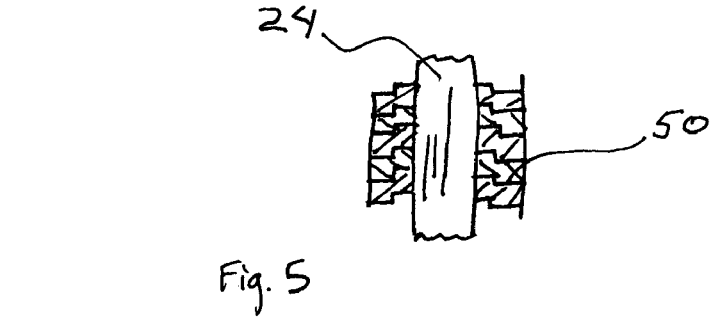
Fig. 5
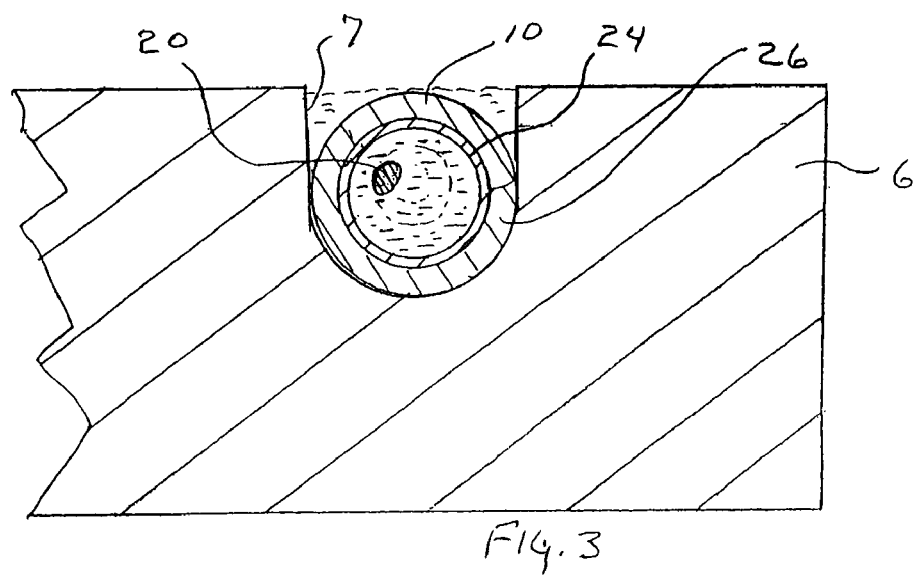
Fig. 3

TUBULAR HEATER AND METHOD OF MANUFACTURE

CLAIM TO PRIORITY

This invention is claims priority to U.S. Provisional Patent Application No. 60/532,152, filed Dec. 23, 2003. The provisional application is hereby incorporated by reference.

FIELD OF THE INVENTION

The present invention relates generally to a heater for use in a mold of an injection molding machine and a method of manufacturing same.

BACKGROUND OF THE INVENTION

Injection molding is used to manufacture a variety of plastic products. Molds used in these processes typically have several sections that when put together define a cavity in which molten plastic resin is injected.

To ensure that the molten plastic resin fills all of the details in the mold cavity, the molten plastic resin is preferably injected into the mold under pressure. The pressures that the molds are subjected to can be extreme and, as such, the mold components are often massive to support such pressures.

The resin pathways, "hot runners," and the nozzles used to inject the molten plastic resin into the mold cavities have ancillary heating to properly maintain the molten plastic resin at a desired temperature. Often other areas of the molds need ancillary heat for controlling molding parameters, for example, controlling the rate of curing or hardening of the molten plastic. Johnson et al., U.S. Pat. No. 6,325,615, and Gellert, U.S. Pat. No. 5,148,594, both relate to systems for heating regions of molds. Because of the relatively hot temperatures and demanding environment at which the heating elements operate, they are subjected to degradation over extended use.

The heating elements are often placed in a meandering channel formed in the mold or mold plate where heat is desired. The heater will typically have a heat generation of approximately 50 watts per inch and the channel will typically be 0.300 to 0.500 inches in diameter. It is imperative that there be good thermal contact between the heater and the channel sidewall surfaces to provide the necessary heating to the mold components as well as to maximize the life of the heater. Ceramic paste or other material may then be utilized to fill the channel. Due to the diameter of these heaters they in the past have not been readily bendable. Attempts to manually bend conventional tubular heaters will generally result in kinks which ruins the heater. Conventionally, the heaters will be bent at the manufacturer or distributor using suitable jigs and powered equipment to the shape of the channel and then shipped to the end user. This adds problems if the bending is not totally accurate, increases the price of the heaters, and causes delays when a heater needs to be replaced. Ideally, the tubular heaters should be manually bendable for placement in the heaters by the end users. They could then be kept in stock and used as needed. Several manually bendable tubular heaters are illustrated in the prior art but they have various drawbacks.

Schmidt, U.S. Pat. No. 5,225,662, discloses a flexible heating element in which the heater core is covered with a plurality of beads. When the beads are placed in an adjacent relationship, the beads overlap each other to thereby protect the heater core from damage. This configuration does not present the possibility of a hermetically sealed tubular heater and can be difficult to manufacture.

Schwarzkopf, U.S. Pat. No. 6,250,911, describes an electrical heater for a mold in an injection molding machine. This patent indicates that the outer casing is formed from a highly ductile metal. The heating element and the insulating material that extends between the heating element and the casing are also flexible. This configuration for the electrical heater is stated to permit the heater to be bent by hand.

Schwarzkopf, U.S. Pat. No. 6,408,503 discloses a method of making an injection mold heating element. The method includes filling a region between a heating wire and an outer casing with a compressible insulating material. The casing is then radially inwardly compressed to form annular grooves.

Although the above heaters and methods of manufacturing them may work in certain applications, such designs may be improved upon to provide more heater to channel wall contact, better containment of the heater element and insulative material, easier and less expensive manufacture, manual or improved manual bendability, capability of bending tighter radii, and better reliability.

SUMMARY OF THE INVENTION

A tubular heater that is manually bendable to fit into a channel comprises a heating element positioned in an insulative material such as magnesium oxide and encased in a continuous inner nickel tubular sheathing. An outer sheathing, in a preferred embodiment, comprises a coil of copper with a nickel coating swaged such that the cross-section of a strand of the coil is generally rectangular. The invention also includes the method of manufacturing and method of use of the tubular heater. Alternate embodiments include an outer tubular sheath that has a multiplicity of slits extending in a circumferential direction through the outer sheathing and the outer sheathing swaged directly on the inner sheathing. For example, a tubing section as illustrated in FIG. 4a could have a plurality of slits cut through the radial thickness and each individual slit not extending entirely around the circumference. A further embodiment includes the outer tubular sheathing formed from a multiplicity of individual rings, the outer sheath could be swaged directly on the inner sheath.

The ends preferably include a threaded connector and a ceramic insulator.

An advantage of the present invention is the ability of the end user to manually bend the heating element to conform to unique mold channels on-site, allowing the heating element to be shipped directly from a distributor without the need for time-consuming, expensive custom bending to ensure a proper fit in the end-users application.

A further advantage of the present invention is the ability to insert heating elements into mold channels having smaller radius curves than was heretofore possible, allowing greater freedom in mold channel design.

BRIEF DESCRIPTION OF THE DRAWINGS

FIG. 3 is a sectional taken at line 3—3 of FIG. 1.

FIG. 4 is perspective view of one possible embodiment of the outer sheath element of the present invention.

FIG. 4a is a cross-sectional view of FIG. 4.

FIG. 5 is a cross-sectional view of a further possible embodiment of the outer sheath element of the present invention.

DETAILED DESCRIPTION OF THE PREFERRED EMBODIMENTS

Figure 1:
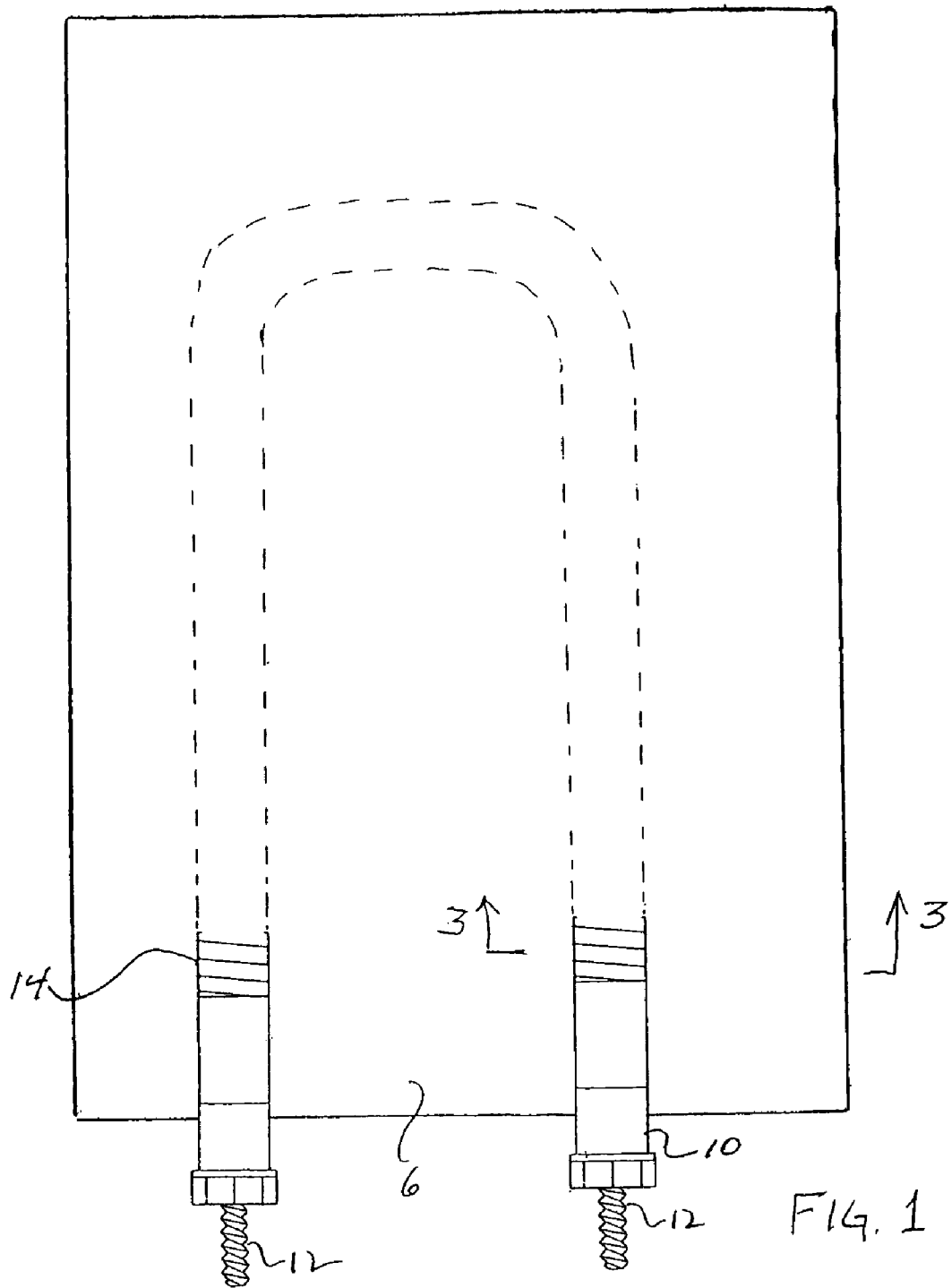
FIG. 1 is a plan view of a tubular heater in accordance with the invention placed in a mold plate.
Figure 2:
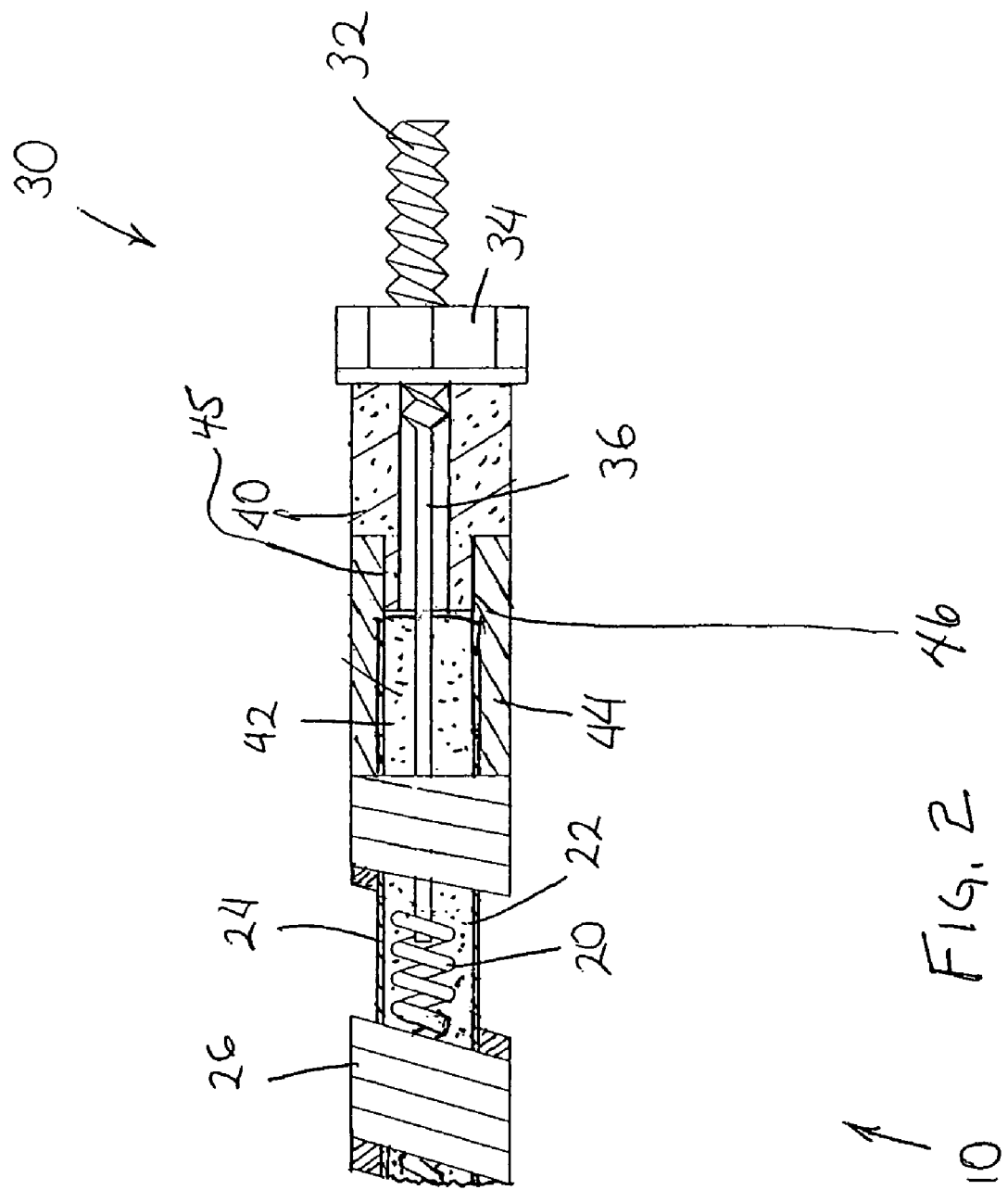
FIG. 2 is an elevational view of an end of a tubular heater in accordance with the invention with sections broken away.

Referring to FIGS. 1, 2, and 3, the present invention is directed to a tubular heater 10 suitable for installation into channels 7 in molding plates or other components of an injection molding component. The heater may have other suitable applications.

The construction of the tubular heater 10 enables it to be manually bent into a desired configuration for use on the mold part. The tubular heater 10 prevents or inhibits entry of moisture into inner portions thereof, which are known to decrease the useful life of the mold heaters.

The heater 10 preferably is capable of handling current in the range of a few hundred watts to a few thousand watts depending on the need of the particular application. The heater 10 preferably has a current of about 50 watts per linear inch but may be, for example, be in the range of about 20 to about 200 watts per inch.

The heater 10 is typically formed with a length of between 0.5 foot and 6 feet depending on the size and shape of the mold on which the heater 10 is to be used.

The heater 10 generally includes a pair of end connectors 12, a body 14 with an exposed outer helical sheath 26. The body having a heating element 20 therein that is embedded or encased in insulative material 22. The heating element 20 used in conjunction with the present invention is preferably fabricated from nickel chromium wire. Preferably, the heating element 20 is in a coiled configuration. The insulation 22 is preferably magnesium oxide or other compositions that are known to a person of ordinary skill in the art.

A shell or inner sheath 24 preferably contains the heater element 20 and insulation 22. The inner sheath 24 is preferably fabricated from nickel that is used with a thickness of about 0.010 inches and preferably in the range of about 0.010 to about 0.025 inches. The inner sheath 24 preferably has an outer diameter of about 0.195 inches but may be in the range of about 0.140 to 0.350. Other sizes may also work in certain embodiments. The outer sheath 26 is preferably swaged on the inner sheath 24 and may comprise a single or a series of spring segments. The outer sheath 26 is preferably fabricated from nickel-plated copper. The outer swaged spring layer provides excellent heat conductivity from the inner sheath and heater element to the mold plate or other components in which the tubular heater 10 is mounted.

Because the outer spring layer 26 includes a plurality of windings when wrapped around the sheath 24, the outer sheath 26 also facilitates manual bending of the heater 10. When the outer spring layer 26 is placed over the shell 24, the heater 10 preferably has a diameter of about 0.315 inches but can be in the range of about 0.200 to about 0.500 inches. In a preferred embodiment where heater 10 has a diameter of about 0.315 inches, heater 10 is manually bendable to conform to radii in mold channels as small as about 0.25 inches.

One of the most important areas of conventional mold heaters is where the mold heater connects to a power supply because the relatively high level of power that passes through the mold heater results in degradation of the weakest portions of the mold heater such as often exists where the heating element intersects the end plug.

A connector 30 used with the tubular heater 10 preferably includes a threaded end connector 32 defining a bolt extending from the heater end.

A lead wire 36 extends between the heating element 20 and the bolt 32. The lead wire 36 is preferably fabricated from nickel. The lead wire 36 is preferably welded or brazed to the heating element 20. The lead wire 36 is preferably brazed to the bolt 32.

A high temperature ceramic preform 40 preferably extends over the lead wire 36. Crushed insulation 42 preferably magnesium oxide, may encase the lead wire 36 intermediate the ceramic perform 40 and the heater 10. A stainless steel cap 44 extends over the inner sheath and a reduced diameter end portion 45 of the ceramic preform 40. The ceramic preform may be secured in place with ceramic paste 46 and the nut 34 screwed on to the threaded portion.

A methodology of manufacturing the heater may be described as follows and includes variation hereto. As an initial step of forming the heater 10 of the present invention, a nickel plated round copper wire is formed into a coil on a form, and swaged on the form to provide a substantially cylindrical inner surface and outer surface. The swaged coil is then removed from the form and will be utilized as the outer sheath 26. This provides the coil with a generally rectangular cross section. The substantially cylindrical inner and outer surface are found to provide excellent heat conductivity between the inner and outer sheaths as well as between the outer sheath and the mold channel in which the heater is inserted.

A heating element 20 is encased with the insulation 22 and the inner sheath 24 with a pair of the lead wires 36 previously attached to the ends of the heater wire and extending out of the inner sheath. Encasing is preferably performed using swaging of the inner sheath with magnesium oxide and the heater element therein with the lead wires already brazed thereto. The encased heater in the inner sheath is sufficiently flexible to facilitate manual bending.

With the end of the heating element 20 preferably extending beyond the sheath 24, one of the connector ends is formed. The stainless steel cap 44 is attached to the inner sheath 24 preferably by swaging and/or by brazing.

Next, the outer spring sheath 26 is slid over the shell 24 until it abuts with the stainless steel cap 44. Sufficient swaged spring segments are applied to reach the predetermined length of the heater. The second end of the heater then has a stainless steel endcap placed thereon. Threaded end portions are attached to the lead wires. The end connectors are completed by inserting the ceramic preforms, preferably utilizing ceramic paste, and securing them with the nuts 34.

Once both of the connectors 30 are attached to the tubular heater 10, the completed heater 10 may be subjected to a swaging step. The heater may also be annealed at temperatures of about 1,800° F. If this annealing process is done, the annealed heater is subjected to a slow cool over at least a few hours.

The heater would preferably be pressfit within the channel of the mold component and suitable filler material, as is known in the art, may then fill the channel.

An alternative to swaging a coil of round wire to form an outer sheath 26 could include winding a rectangular shaped wire, thus providing the substantially cylindrical inner and outer surfaces. Such a coil may then be swaged onto inner sheath 24.

A further alternative could be to provide an outer sheath 26 formed of a section of solid tubing, and then cutting slits 50 therein, said slits 50 preferably extending entirely through the radial thickness of the tubing wall but not entirely circumferentially around the tubing. The slits 50 may be open or closed, for example, if the outer slit tubing is swaged onto the inner sheath 24, the slits 50 may be closed.

Outer sheath 26 includes a substantially cylindrical inner surface 52 and a substantially cylindrical outer surface 54.

It is contemplated that features disclosed in this application, as well as those described in the above applications incorporated by reference, can be mixed and matched to suit particular circumstances. Various other modifications and changes will be apparent to those of ordinary skill. Patents previously mentioned, specifically U.S. Pat. Nos. 6,325,615, 5,148,594, 5,225,662, 6,250,911, and 6,408,503 are incorporated herein by reference.

What is claimed:

1. A bendable tubular heater for use in an injection molding component, the heater comprising:
   a flexible heating element wire having two ends;
   two electrical connectors, each one in electrical connection to one of the two ends;
   a continuous tubular first metallic sheath, said first metallic sheath having an intermediate portion and two ends, the heating element wire extending through the intermediate portion of the metallic sheath;
   insulative material surrounding and supporting the heating element wire within said first metallic sheath;
   a second metallic sheath having a radial thickness and formed of at least one swaged helically wound coil, said sheath encasing and engaging the first metallic sheath, whereby a closed helical slit extends entirely thru the radial thickness of the second metallic sheath providing improved bendability.

2. The bendable tubular heater of claim 1, wherein the outer sheath comprises a series of swaged helically wound coil segments.

3. The bendable tubular heater of claim 1, further comprising two end closures, one at each end of the first metallic sheath.

4. The bendable tubular heater of claim 1, wherein the tubular heater has a pair of ends and each of said ends has one of said electrical connectors thereon, and wherein each of said electrical connectors has a threaded member.

5. The bendable tubular heater of claim 1, further comprising a pair of lead wires, each one of said lead wires electrically connecting one of said two ends of the flexible heating wire with one of the two electrical connectors.

6. The bendable tubular heater of claim 1, where in the heating element comprises a coil of wire.

7. A bendable tubular heater for use in injection molding components, the heater comprising a heating element wire surrounded by an insulative material and encased within a first metallic sheath; a second metallic sheath engaged around the first metallic sheath, the second metallic sheath having a wall with a radial wall thickness and having at least one slit extending generally circumferentially around the second metallic sheath, said at least one slit extending entirely through the wall of the second metallic sheath.

8. The bendable tubular heater of claim 7, wherein the at least one slit is a closed slit and extends in a helical orientation along the second metallic sheath.

9. The bendable tubular heater of claim 7, wherein the second metallic sheath has a plurality of generally circumferentially extending slits, each of said slits extending entirely through the wall of the second metallic sheath.

10. The bendable tubular heater of claim 9, wherein the plurality of generally circumferentially extending slits are defined by a series of metallic rings.

11. The bendable tubular heater of claim 9, wherein the plurality of generally circumferentially extending slits are defined by and the second metallic sheath comprises a plurality of helically shaped coil segments.

12. A method of manufacturing a bendable elongate heater according to claim 7, comprising the steps of swaging a helical coil of wire to form the second metallic sheath and inserting the first metallic sheath within said second metallic sheath.

13. A method of manufacturing a bendable elongate heater for use in injection molding equipment component, the method comprising the steps of:
    encasing an electric heater element wire supported by insulative material within a first tubular metallic sheath;
    forming a second metallic sheath with a wall thickness and having at least one slit extending entirely thru the wall thickness, said slit in a circumferential or helical orientation on the second metallic sheath;
    engaging the second metallic sheath concentrically around the first metallic sheath.

14. The method of claim 13, wherein the step of forming a second metallic sheath includes the step of winding a helical coil of wire on a form.

15. The method of claim 14, further comprising the step forming a second metallic sheath includes the step of swaging the helical coil of wire on the form to form at least a portion of the second metallic sheath.

16. The method of claim 13, wherein the electric heater wire has two ends and the method further comprising the step of electrically connecting each of the two ends of the electrical heater wire to a pair of threaded connectors.

17. The method of claim 13, further comprising the step of manually bending the heater at a location of use where the injection molding equipment is located and insertion of the bent heater into the injection molding component.

* * * * *